Nov. 27, 1945.　　　K. M. GAVER　　　2,389,770
POWDERED FLAVOR
Filed Dec. 2, 1939

KENNETH M. GAVER,
Inventor

Patented Nov. 27, 1945

2,389,770

UNITED STATES PATENT OFFICE 2,389,770

POWDERED FLAVOR

Kenneth M. Gaver, Columbus, Ohio, assignor, by mesne assignments, to The Ohio State University Research Foundation, Columbus, Ohio, a corporation of Ohio Application December 2, 1939, Serial No. 307,245

6 Claims. (Cl. 99—140)

My invention relates to powdered flavors, powdered flavor materials and a method of making.

It is the object of my invention to provide a powdered flavoring material by which the distribution of the essential flavor is secured.

It is an object to accomplish this better distribution of the essential flavor in any product with which it is mixed by coating the surface of granules composing the elements of a dry colloid of hydrophilic nature.

It is an object to provide such a colloid that when the dry powdered flavoring material is mixed with the product with which it is to be flavored, that the moisture of the product so flavored or the moisture added to the product will rupture the coating of the colloid granules permitting the moisture to be absorbed by the contents of the colloid granules to thereby aid in distributing the flavor.

Furthermore, it is an object when the flavoring product of this invention is placed in materials where it is mixed or homogenized, then the colloid granules are mechanically broken down into numerous small colloid granules so that when this is done in the presence of moisture there results a series of thin films of flavoring material which insures substantially perfect and uniform diffusion of the flavoring substance throughout the entire body of material to be flavored.

It is an object of this invention to provide an inert tasteless colloid carrier the granules of which comprise a sack which protects the crystalline structure within the sack from the absorption of moisture which crystalline structure is capable when the sack is ruptured of absorbing many times its weight in water.

It is an object to coat this colloid sack with a flavoring material which is water insoluble and when the sacks are ruptured and the contents of the sack absorbs many times the weight of the contents of the sacks of crystals, the flavoring material is distributed throughout the material with which this product is mixed.

In particular it is the object of this invention to employ rice starch which is substantially tasteless and is a dry colloid composed of numerous granules consisting of sacks protecting and containing crystals that, in the presence of water, will take up approximately ten times their weight in water. To this rice starch is added a flavoring extract of the desired strength so that the flavoring extract coats the surface of the granules. This negative colloid consisting of the rice starch normally contains ten to twelve per cent moisture. The addition of a negative colloid is of advantage in that it contributes to the stability of the ice cream or other milk-containing products by substantially neutralizing the destabilizing effect of positive colloids and positive ions, i. e., Ca and Mg ions, etc., which are known to be frequently present in excessive amounts. The starch must contain between ten and twelve per cent moisture since drying below this moisture content interferes with the subsequent hydration of the colloid and thus lowers the stabilizing ability of the colloid.

It is an object to provide such a coated dry colloid that the moisture present in any admixture will rupture the sack, swell the crystals of the sack and thereby distribute the water insoluble flavor throughout the resulting product, which mixture may be increased and accelerated by mechanical mixing or homogenization so that the initial size of the colloid granules will be further broken down into numerous small colloid granules with the result that a series of thin films of the flavor are distributed throughout the mass of the resulting product.

In particular it is the object of this invention to provide for a dry powdered flavoring material that can be mixed conveniently with other dry materials so that all the proportions can be maintained on the same basis.

It is an additional object to provide a flavoring material for ice cream and similar products which will not only flavor the ice cream by an even distribution of flavoring films throughout the body of the ice cream but do so without leaving any particles of flavoring material to discolor the ice cream. For instance, heretofore in the art some black specks of vanilla have appeared characteristically in vanilla ice cream due to the fact that the vanilla bean particles constituted water insoluble residue elements of the vanilla extract. The bean in the prior art is ground and is introduced into the ice cream so that the bean is water insoluble and only a portion of extract is distributed throughout the ice cream and this is done so only by the physical operation through mixing. The vanilla is added either as ground beans as stated or as an alcoholic solution which destabilizes the casein at point of contact, thereby precipitating the casein with the vanilla extract not only on the outside of the casein but also inside the precipitated particle. The alcohol carrying the vanilla extract being diluted to such an extent that the vanilla extract is no longer soluble and precipitates out as water insoluble fat globule. In either case the net result is the formation of small dark specks. In the first case the vanilla extract is deposited on casein particles which are losing water of hydration and shrinking and in the second case the vanilla extract is precipitated in small globules whereas in the case of this invention the reverse is true since the vanilla is precipitated on the carrier which swells under the same conditions. Such swelling causing a diminution of the thickness of the adsorbed layer with the net result of forming thin films throughout the mix.

In the old art mixing of flavor extracts in bakery products has been by way of alcoholic extracts. When this liquid flavoring material is introduced into the dry mix of the baker product prior to baking, it localizes itself and tends to concentrate the flavoring in one part of the dry mix and to form lumps and balls in the mixture. It is very difficult, if not impossible, to distribute the flavoring material throughout the entire body of the dry mixture of the bakery product.

With the dry flavoring material of this invention, the mixture with other dry bakery materials prior to baking is easily and completely effected for uniform distribution. If the mixture of this flavoring material is in water materials such as ice cream, then the action heretofore described serves to effect the mixture to a far greater degree than the mechanical mix or homogenization that is customarily practiced in incorporating flavoring materials into ice cream.

It is a further object of this invention to provide such an inert colloid carrier as to prevent any alteration of the taste of the resulting product.

It is a further object of this invention to provide a flavoring material that will also enable ice cream better to resist "heat shocking" which brings about shrinkage of the ice cream.

It is a further object to provide a flavoring material that will form a gel on the surface of the ice cream so as to build up a bound water film on the ice cream to render it impervious to the action of the outside air so as to prevent a breakdown of the emulsified ice creams and to prevent evaporation of the water and the loss of incorporated air which results in shrinkage of the ice cream.

Referring to the drawing.

Figure 1:
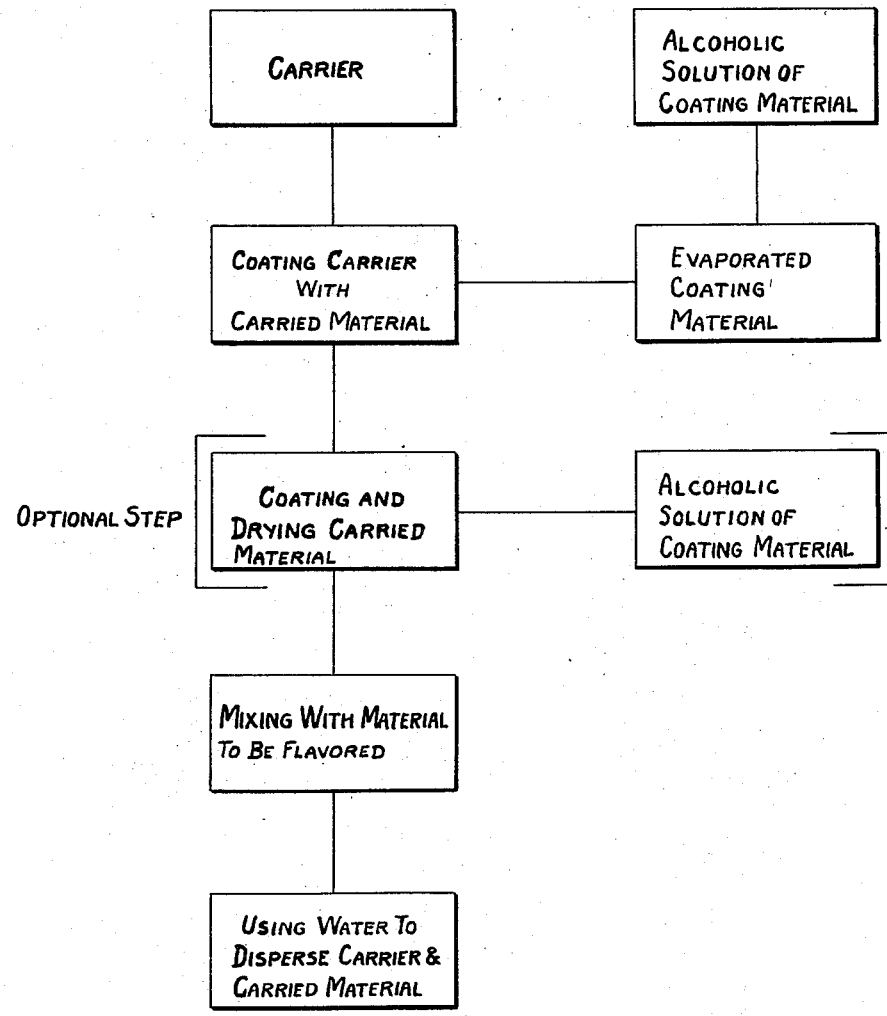
Figure 1 is a diagrammatic illustration of the several steps in the process by producing this flavoring product of this invention.

Referring to the drawing in detail, the following is a typical example of one form of this material.

Example I

| | Grams |
|---|---|
| Rice starch of the approximate fineness of being able to pass through a screen of 100 mesh to the inch | 28½ |
| Vanilla extract. (This alcoholic extract of the vanilla bean is measured after all of the alcohol has been removed) | 9 |

Figure 2:
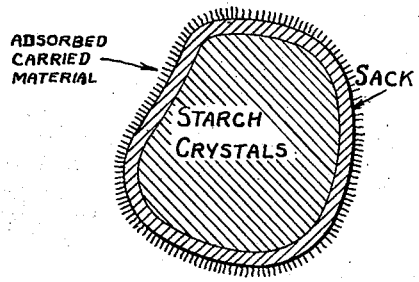
Figure 2 is a diagrammatic view of an enlarged section through a rice starch granule that has been coated with a flavoring material such as an alcohol extract of vanilla.

The foregoing is mixed at room temperature in order to effect a surface coating on the starch granules of the character shown in Figure 2. The concentration of flavoring materials should be kept just sufficient to merely coat the surface of the granules. The granules at this stage have approximately ten to twelve per cent moisture.

Example II

In the event that it is desired to combine the alcoholic mixture of the flavoring material, such as vanilla, with the starch, this can be effected by mixing the two and thereafter evaporating the alcohol from the mixture leaving the starch coated with the extract and with substantially ten to twelve per cent moisture. The alcohol will not rupture the starch granules which are only ruptured in the presence of water that is later found in the ice cream or other materials with which this flavoring material is mixed.

Example III

In the event it is desired to prevent deterioration of the materials with which the flavoring materials are mixed, it has been found desirable to incorporate with the flavoring material an antioxidant such as oat or corn flour. An example of this mixture is as follows:

| | Grams |
|---|---|
| Rice starch | 28½ |
| Alcohol extract reduced to dry form of a vanilla extract | 9 |
| An antioxidant | 12½ |

Example IV

In order to provide an anti-shock or anti-shrinkage medium to prevent "heat shocking" of ice cream with which this material may be mixed, there is added materials such as sodium gelatinate, sodium caseinate or a new material such as sodium starch, the method of making which is more fully set forth in a companion application.

Under such circumstances, the following is a typical formula.

| | Grams |
|---|---|
| Rice starch | 28½ |
| A dry alcohol extract of a flavoring material such as vanilla | 9 |
| Anti-heat-shocking agent such as sodium gelatinate or sodium caseinate or sodium starch | 12½ |

In the event the sodium starch is employed, it has been discovered that this acts as a wetting agent and facilitates the formation on the surface of the ice creams of small highly hydrated sodium colloid particles to put a bound water film over the ice cream due to the formation of a sodium gel. This completely hydrated sodium gel substantially impervious to water or air prevents heat shocking of ice creams by preventing the breaking down of the emulsified cream and evaporation of water and loss of incorporated air, thus substantially preventing shrinkage due to heat shocking.

Example V

If it is desired to incorporate a stabilizer so as to insure satisfactory stabilization of ice cream, a stabilizer either by itself or the anti-shocking agent in combination with it, either with or without the flavoring material, may be employed. The principle involved here in this invention which is one of the foundations of the discovery made is that it is possible to take a negative colloid that is resistant to the moisture in the air and utilize this hydrophilic dry colloid as a carrier for flavoring materials, antioxidants, stabilizers or anti-heat-shocking agents, all of which must be evenly distributed throughout the material with which the ultimate mixture is to be made. This principle of the invention is of great importance for the reason that by this discovery it is now possible to effect a mixture of the carrier material and the carried material by the presence of water in the ultimate mixture. The addition of a negative colloid is of advantage in that it contributes to the stability of the ice cream or other milk-containing products by substantially neutralizing the destabilizing effect of positive colloids and positive ions, i. e., Ca and Mg ions, etc., which are known to be frequently present in excessive amounts. The starch must contain between ten and twelve per cent moisture since drying below this moisture content interferes with the subsequent hydration of the colloid and thus lowers the stabilizing ability of the colloid. Furthermore, it is apparent that these dry powdered hydrophilic colloids are capable of taking up many times their weight in water when the colloid sacks are ruptured by the water and this affinity for water thereby brings about the adequate expansion and distribution of the flavoring or other material carried by the granules of the colloid. It is possible by this discovery to either effect a thorough distribution of the dry colloid in dry materials by mechanically mixing and thereafter applying the water or other solvent to the entire mixture; or this dry colloid acting as the carrier with which flavoring materials or other materials have been incorporated without rupturing the starch granules may be directly introduced into water bearing media such as ice cream. An understanding of this principle will open up the vista of the numerous applications of this invention, only a few of which have been explored to date.

For instance, this process comprehends the following typical steps. The recitation of them is not meant to be either inclusive or exclusive of all the steps. The typical steps are:

(a) The process of providing a dry colloid normally having a relatively low moisture content. This colloid is hydrophilic in nature. For the purpose of description, this hydrophilic character is denominated as a "carrier."

(b) There is provided on the granules of this colloid in permanent association with it, a coating of flavoring or other materials known as the "combined carried materials." The "carried material" must not be of such character as to bring about a rupturing of the granules of the "carrier" colloid.

(c) The application of water which will rupture the starch sacks to bring about the hydration of the starch crystals in the sack so that they will take up many times their weight of water and by their swelling and later mechanical disintegration and distribution carry with them throughout the mixture the "carried materials" such as the flavoring materials to form innumerable films throughout the resulting mixture. In the case of ice cream when sodium starch is employed, then a hydrated gel is formed on the surface of the ice cream for the purposes described.

*Example VI*

In the event it is desired to prevent syneresis or squeezing out of air or water in ice cream and it is desired to increase the whipping qualities of the ice cream and improve the overrun, it has been found that the use of sodium citrate, sodium phosphate or sodium colloid permits the sodium to take the place of the calcium. The calcium ion will precipitate as calcium citrate, calcium phosphate or calcium colloid. When the sodium takes the place of the calcium it forms a soft curd which is a sodium gel that more rapidly and easily disintegrates. This results in making the ice cream or other similar products much more easily digestible.

Typical formulas are as follows:

| | Grams |
|---|---|
| Rice starch | 28½ |
| A concentrated flavoring extract | 9 |
| Sodium citrate, sodium phosphate or sodium starch | 12½ |

Another typical formula is as follows:

| | Grams |
|---|---|
| Sodium starch | 28½ |
| Concentrated flavoring extract | 9 |

There may be optionally added to the foregoing appropriate amounts of sodium alginate, sodium citrate, sodium phosphate or sodium caseinate.

*Flavoring extracts*

In the event that the carried material is a flavoring material, numerous flavors may be employed. The percentage given in the above examples for the flavoring or carried materials is purely typical and this invention is not limited to such proportions.

In the trade it has been customary to have the powdered vanilla extract contain about 25% of the ground vanilla bean or its equivalent in alcoholic extractives which would normally be about 3% of oleoresin. It is obvious that the amount of extract can be constituted as desired in order to give the requisite strength. The vanilla bean may be extracted with either alcohol or an oleoresin vanilla extract may be employed.

The flavoring materials are of a great variety. Typical materials are vanilla, lemon and strawberry. Suitable permissible food dyes may be added in the desired quantities for coloring purposes.

*Typical uses*

In addition to the ice cream industry and the domestic and commercial bakery products with which these materials of this invention are primarily to be mixed, the principle of this invention is applicable to such food products as chocolate milk. The use of this product prevents the settling of the cocoa powder and gives a smooth homogeneous drink without either the unpleasant clinging after taste or the tendency of sedimentation that is sometimes characteristic of this drink. This invention is further adaptable to flavoring syrups used in soda fountains as it prevents crystallization in view of the fact that it forms a gel that gives a smooth homogeneous character that is so desirable in soda fountain syrups.

It is also adaptable in candy manufacture to the making of fondants, cream centers, et cetera, where similar characters of even distribution of flavor is required and lack of crystallization and gel character desired.

Sodium starch, the process of making of which is the subject of a companion application is the result of combining starch and sodium hydroxide and thereafter drying to powdered form with substantially no free alkali. The procedure is to use sufficient alkali to give the minimum surface tension and maximum viscosity in the resulting product, and to provide an ultimate gel when the solvent is applied to the sodium starch, so that the maximum hydration of the gel can be secured.

This invention is further useful in connection with perfumes, deodorants and materials for combating insects. For instance, the incorporation of pine oil and/or other suitable ingredients as carried material provides a powder for use in preventing the action of moths on clothing. Perfumes can likewise be distributed as this invention makes it possible to use powdered perfumes with the maximum carrier power which can either be used dry or later incorporated in solution. It is useful in connection with various types of deodorants where similar problems arise.

It is understood that the particular proportions set forth in the above formulas are merely typical and that varying proportions may be employed depending upon the type of "Carrier" and the type of "carried" material. This invention is not confined to the use of rice starch, but its presence may be employed with a wide variety of "carrier" materials of colloid nature.

It will be understood that it is desired to comprehend within this invention such modifications as come within the scope of the claims and which are required to adapt it to various conditions and uses.

Having thus fully described my invention, what I claim as new and desire to secure by Letters Patent is:

1. A new article of manufacture comprising rice starch the granules of which have a coating of flavoring material and an anti-heat-shocking agent.

2. A new article of manufacture comprising rice starch the granules of which have a coating of flavoring material and an agent for producing a soft curd.

3. As a new article of manufacture in combination a dry hydrophylic colloid comprising rice starch, a flavoring agent, an agent adapted to form a hydrated sodium gel on contact with moisture on the surface of the granules of said starch, and ice cream, said article being characterized by the fact that the ice cream particles are coated with hydrated sodium gel deposited on the surface thereof and simultaneously flavored.

4. As a new article of manufacture in combination a dry hydrophylic colloid comprising rice starch, a flavoring agent deposited on the surface of the starch granules, and a sodium compound selected from the class including sodium alignate, sodium gelatinate, sodium caseinate and sodium starchate, said starch granules being adapted spontaneously to rupture on contact with moisture at room temperature, thereby forming a gel which will absorb substantial quantity of water and disperse the carried flavoring agent and sodium compound throughout a product to be flavored and stabilized.

5. As a new article of manufacture in combination a dry hydrophylic colloid comprising rice starch, a flavoring agent deposited on the surface of the starch granules, and a sodium compound selected from the class including sodium citrate and sodium phosphate, said starch granules being adapted spontaneously to rupture on contact with moisture at room temperature, thereby forming a gel which will absorb substantial quantity of water and disperse the carried flavoring agent and sodium compound throughout a product to be flavored and stabilized.

6. A new article of manufacture comprising 28.5 parts by weight of rice starch, 9 parts of flavoring material and 12.5 parts of an anti-heat-shocking agent, said article being characterized by the fact that the starch granules are coated with said flavoring material.

KENNETH M. GAVER.